Dec. 24, 1968     D. M. WILSON, JR     3,417,957
QUICK-CHANGE LICENSE PLATE HOLDER
Filed Oct. 14, 1966
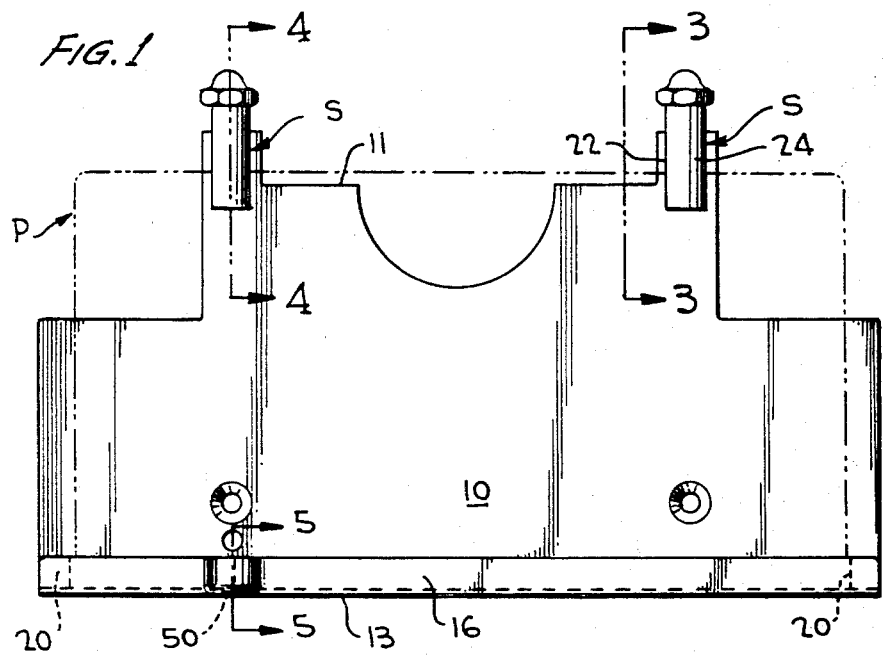
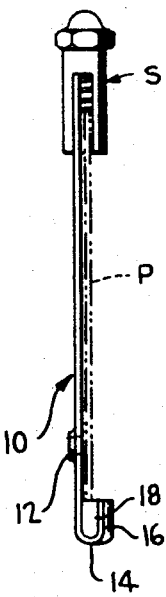
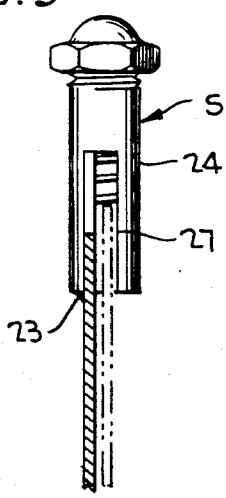
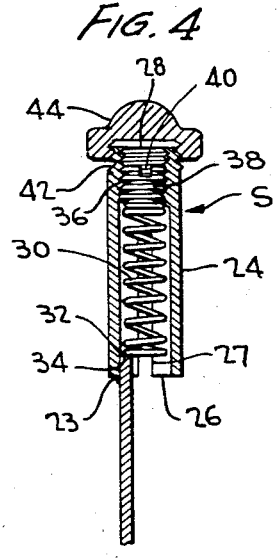
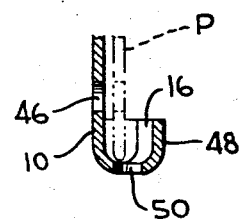
INVENTOR,
D. MALLOY WILSON, JR.
BY *Jacobi & Davidson*
ATTORNEYS

United States Patent Office 3,417,957
Patented Dec. 24, 1968

3,417,957
QUICK-CHANGE LICENSE PLATE HOLDER
Duncan Malloy Wilson, Jr., R.F.D. 2,
Manning, S.C. 29102
Filed Oct. 14, 1966, Ser. No. 586,800
7 Claims. (Cl. 248—488)

ABSTRACT OF THE DISCLOSURE

This invention relates to a license plate holder which is adapted to hold plates of different sizes without the use of separate fasteners. The device has a lower plate receiving flange and a pair of upper adjustable yieldable retainers for holding the upper edge of the plate in position.

---

The invention relates to sign holders and more particularly to holders for vehicle license plates so constructed that such license plates may be easily and quickly inserted into a holder or removed therefrom.

While the use of rust resistant nuts and bolts has considerably reduced the time and effort required to remove license plates from their mounting brackets when compared with the time and effort required when nuts and bolts subject to corrosive action are employed, they still require the use of a screwdriver and wrench or similar tool to securely fasten or remove a license plate to or from its support.

It is, therefore, a primary object of the present invention to provide a license plate holder into which the license plate may be firmly secured and readily removed without the use of fastening means such as nuts and bolts.

A further object of the invention is to provide a license plate holder into which the license plate may be inserted or from which it may be removed without the need of tools.

A still further object of the invention is to provide such a license plate holder that is adapted to support license plates of various sizes without the holder itself being formed of relatively movable parts.

Another object of the invention is to provide a license plate holder which is of sufficient extent and rigidity that the license plate supported thereby will be substantially protected against deformation by impacts from other vehicles.

Yet another object of the invention is to provide such a license plate holder in which an adjustable biasing means yieldingly retains the license plate within the holder with sufficient force to prevent accidental release of the license plate therefrom and to prevent the occurrence of objectionable noise due to vibration of the license plate within holder.

Still another object of the invention is to provide a license plate holder having openings therein so positioned relative to the openings normally provided in a license plate, that a locking means may be inserted through the holder openings and license plate openings to prevent theft of the license plate.

An additional object of the invention is to provide a license plate holder which is simple in construction, durable annd inexpensive to manufacture.

In the drawings:
FIGURE 1 is a front elevation of the device.
FIGURE 2 is an end view of the device.
FIGURE 3 is a sectional view of the device taken along line 3—3 of FIGURE 1 showing the spring means compressed by a license plate.
FIGURE 4 is a sectional view of the device taken along the line 4—4 of FIGURE 1 showing the spring means extended.

FIGURE 5 is a sectional view taken along line 5—5 of FIGURE 1.

Referring to the drawings in detail, the numeral 10 indicates the body plate of the holder which has a length commensurate with that of the longest license plates now in use. Body plate 10 is provided with at least a pair of spaced openings 12 through which fastening means, such as screws or bolts extend to secure the license plate holder 10 to a bumper or other suitable available support on an automobile or other vehicle. Openings 12 are countersunk to prevent rubbing of the license plate P against the fastening means.

The body plate 10 has opposed edges 11 and 13. A forwardly projecting flange means 14 that is bent upwardly as at 16, extends from edge 13 to form a U-shaped channel means 18. An insert member 20 is secured in any conventional manner to each end of channel means 18 so as to preclude the license plate P from sliding laterally from channel means 18 and to prevent the U-shaped channel means from being collapsed.

A pair of spaced spring means S are secured within slots 22, formed in the body plate 10 adjacent edge 11, by welding or brazing said spring means S to said body plate 10, as indicated at 23.

Each spring means S comprises a hollow spring-housing 24, preferably circular in cross-section and open at its opposite ends 26, 28. Each hollow spring-housing 24 is disposed in its associated slot 22 so that the bottom edge of the slot lies across the open end 26 of a hollow spring-housing 24. A spring 30 is disposed in each hollow spring-housing 24 so that its lower end 32 bears against the upper edge 34 of body plate 10 and is supported by the body plate. The open end 26 of hollow spring-housing 24 is provided with a slot 27 which extends transversely thereacross and longitudinally a distance at least slightly in excess of the depth of the U-shaped channel means 18.

The interior of end 28 of hollow spring-housing 24 opposite end 26 is threaded at 36. A threaded nut 38 is supported by threads 36 and engages the upper end of spring 30. Nut 38 is provided with a kerf 40 for adjusting the position of nut 38 within hollow spring-housing 24 and thereby vary the amount of force which must be overcome in order to further compress spring 30. Threads 42 are provided on the exterior of hollow spring-housing 24. A cap 44 is mounted on threads 42 and forms a closure for the open end of hollow spring-housing 24 thereby protecting the hollow spring-housing 24 against the entry of objectionable matter such as dirt or rain.

An opening 46 is provided in the body plate 10 adjacent its lower edge 13. Opening 46 is so positioned in body plate 10 that it will be in alignment with one of the openings usually provided in a license plate when a license plate is inserted in the license plate holder 10. A further opening 50 is provided in the bottom of channel means 18 and lies in the same vertical plane as opening 46. The upwardly extending portion 16 of flange means 14 is also provided with a bowed portion 48 in alignment with both of the previously mentioned openings 46, 50. The location of the aligned openings and bowed portion 48 is such that a locking device, for example, a padlock, may be inserted through the aligned openings 46, 50 in the license plate holder and in the license plate to prevent unauthorized removal or theft of the license plate.

It is within the scope of the present invention to provide the outer face of the upwardly extending portion 16 of flange means 14 with advertising matter, such as the name of an automobile dealer or any other information, if desired.

In use of the described embodiment of the invention, the body plate 10 is secured to any suitably located structure of a vehicle, such as a bumper, and it is intended that it remain so attached for the life of the vehicle. When it is desired to provide the vehicle with a license plate, such as P, all that is necessary is that one edge of such license plate be inserted into slots 27 at an angle to the body plate 10 against the force of springs 30 until its lower edge extends above the upper edge of flange means 14. Thereafter, the lower edge of the license plate is moved toward the body plate 10 until such lower edge overlies the U-shaped channel means 18. The license plate is then released and the springs 30 force its lower edge into secure engagement with the bottom of the U-shaped channel means.

When it is desired to remove a license plate from its holder, a reverse operation is performed. That is, the license plate is raised above the top of flange means 14 against the force of springs 30. When the lower edge of license plate P is above the top of flange means 14, it is moved forwardly of the U-shaped channel means 18 and the springs 30 are allowed to expand again and push the license plate away from the holder.

In order to prevent unauthorized removal or theft of the license plate from the holder 10, a padlock or similar locking device may be inserted through the aligned openings in the license plate and license plate holder.

After reading the foregoing detailed description, it will be apparent that the objects set forth above initially have been successfully achieved. Accordingly, what is claimed is:

1. A license plate holder comprising a body plate having opposed edges; flange means disposed adjacent one edge of the body plate; spring means; means to support said spring means closely adjacent the opposite edge of the body plate; said spring means including a spring arranged to directly contact and releasably bias a license plate into engagement with said flange means; said spring means including a hollow spring-housing having a first inner open end facing said channel means; a slot extending transversely across the open end of said spring-housing; said slot being parallel to and closely adjacent said body plate.

2. A license plate holder as in claim 1 wherein said hollow spring-housing has a second outer open end; longitudinally adjustable means within said second outer end forming an adjustable backing for said spring means whereby the biasing force of said spring means may be varied.

3. A license plate holder as in claim 2 wherein the outer end of said spring-housing is provided with a closure cap.

4. A license plate holder as in claim 3 wherein said body plate is provided with a recess, and said spring-housing is positioned within said recess and brazed to said body plate.

5. A license plate holder comprising a body plate having opposed edges; flange means disposed adjacent one edge of the body plate; spring means; means to support said spring means closely adjacent the opposite edge of the body plate; said spring means including a spring arranged to directly contact and releasably bias a license plate into engagement with said flange means; said spring means comprising a pair of spaced hollow spring-housings; each of said spring-housings having a first inner open end facing said flange means; a slot extending transversely across the open end of said spring-housing; said slot being parallel to and closely adjacent said body plate.

6. A license plate holder as in claim 5 wherein each of said hollow spring-housings has a second open end; longitudinally adjustable means within each of said second outer ends forming adjustable backing means for each of said spring means whereby the biasing force of each of said spring means may be varied.

7. A license plate holder as in claim 6 wherein said flange means comprises a channel means; the ends of the channel means are each provided with an insert member across said channel means which serves as a brace for said channel means and also precludes removal of a license plate from said holder lengthwise of said channel means; the outer end of each of said hollow spring-housings is provided with a closure cap; said body plate is provided with spaced recesses, the said spring-housings being respectively positioned within said recesses and brazed to said body plate; a plurality of countersunk openings extending through said body plate; and said body plate and said channel means being provided with aligned openings to receive a license plate locking means therethrough.

References Cited

UNITED STATES PATENTS

| | | | |
|---|---|---|---|
| 1,238,816 | 9/1917 | Poole | 248—316 XR |
| 2,328,252 | 8/1943 | Barker | 248—488 XR |
| 2,599,259 | 6/1952 | Hooks | 248—488 |
| 2,791,046 | 5/1957 | Goldberg | 248—316 XR |
| 2,899,154 | 8/1959 | Zavolner | 248—316 XR |

ROY D. FRAZIER, *Primary Examiner.*

U.S. Cl. X.R.

248—316